(12) United States Patent
Lui et al.

(10) Patent No.: US 9,277,345 B2
(45) Date of Patent: Mar. 1, 2016

(54) SIGNAL STRENGTH INDICATOR FOR MULTICAST BROADCASTING IN A WIRELESS NETWORK

(71) Applicants: Verizon Patent and Licensing, Inc, Arlington, VA (US); Cellco Partnership, Arlington, VA (US)

(72) Inventors: Danny Chick-Leung Lui, Belle Mead, NJ (US); John Gu, Rockaway, NJ (US); Sergio Aguirre, Southlake, TX (US); Musa Kazim Guven, Fort Lee, NJ (US); Rakesh H Chandwani, Freehold, NJ (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 81 days.

(21) Appl. No.: 14/029,314

(22) Filed: Sep. 17, 2013

(65) Prior Publication Data
US 2015/0078179 A1    Mar. 19, 2015

(51) Int. Cl.
| H04W 24/08 | (2009.01) |
| H04W 4/00 | (2009.01) |
| H04M 1/00 | (2006.01) |
| H04B 17/318 | (2015.01) |
| H04W 48/16 | (2009.01) |

(52) U.S. Cl.
CPC ............... *H04W 4/00* (2013.01); *H04B 17/318* (2015.01); *H04M 1/00* (2013.01); *H04W 48/16* (2013.01)

(58) Field of Classification Search
CPC ..... H04W 76/02; H04W 52/54; H04W 24/08; H04B 1/10; H04B 7/00
USPC .......................... 370/235, 316, 338; 455/418
See application file for complete search history.

(56) References Cited

U.S. PATENT DOCUMENTS

| RE40,340 E * | 5/2008 | Ghaly ........................ 273/153 R |
| 8,738,023 B2 * | 5/2014 | Gabara et al. .............. 455/452.2 |
| 9,025,511 B2 * | 5/2015 | Zhu et al. ...................... 370/312 |
| 2004/0203698 A1 * | 10/2004 | Comp .......................... 455/421 |
| 2004/0203987 A1 * | 10/2004 | Butala .......................... 455/522 |
| 2005/0282571 A1 * | 12/2005 | Oprescu-Surcobe et al. 455/503 |
| 2007/0002846 A1 * | 1/2007 | Rada et al. ................... 370/358 |
| 2007/0026862 A1 * | 2/2007 | Hicks et al. .................. 455/436 |
| 2008/0188194 A1 * | 8/2008 | Liu ............................ 455/226.4 |
| 2009/0181725 A1 * | 7/2009 | Koncelik, Jr. ................ 455/566 |
| 2010/0015983 A1 * | 1/2010 | Anigstein ..................... 455/436 |
| 2011/0021224 A1 * | 1/2011 | Koskinen et al. ............. 455/507 |

(Continued)

OTHER PUBLICATIONS

Qualcomm Corporation, "eMBMS Signal Indication Proposal" Ver. 1.1, pp. 1-6, Aug. 24, 2012.

(Continued)

*Primary Examiner* — Chandrahas Patel
*Assistant Examiner* — Lan Huong Truong

(57) ABSTRACT

The quality of a multicast broadcast that is being received by a mobile device may be determined. In one implementation, a method may include receiving a radio signal corresponding to a multicast broadcast of content; measuring a strength of the received signal; determining a minimum signal strength to receive the content associated with the multicast broadcast; determining a signal quality metric, associated with the multicast broadcast, the signal quality metric being based on a difference between the measured strength of the signal and the determined minimum signal strength; and providing a visual indication of the signal quality metric.

21 Claims, 10 Drawing Sheets

(56) References Cited

U.S. PATENT DOCUMENTS

| | | | |
|---|---|---|---|
| 2011/0311026 A1* | 12/2011 | Lalena | 378/98.5 |
| 2013/0226451 A1* | 8/2013 | O'Neill et al. | 701/450 |
| 2013/0301509 A1* | 11/2013 | Purnadi et al. | 370/312 |
| 2014/0016491 A1* | 1/2014 | Gholmieh et al. | 370/252 |
| 2014/0269338 A1* | 9/2014 | Jung et al. | 370/241 |

OTHER PUBLICATIONS

Verizon Wireless, "Device Requirements—LTE Data Devices", Ver. 22, pp. 1-87, Jun. 2013.

Verizon Wireless, "Device Feature Definitions / Requirements", Ver. 43, pp. 1-199, Jul. 2012.

* cited by examiner

SIGNAL STRENGTH INDICATOR FOR MULTICAST BROADCASTING IN A WIRELESS NETWORK

BACKGROUND

In an increasingly networked world, more and more traffic, such as data, voice, and video, is transmitted over public and proprietary networks. Wireless networks, in particular, are becoming increasingly popular as networks through which subscribers obtain both voice services (e.g., telephone calls) and data services (e.g., email and web surfing).

One class of mobile wireless devices, such as smart phones and tablet (e.g., "pad") computing devices, may include mobile communication devices that are designed to provide additional functionality, such as the ability to execute a variety of general purpose computing applications. Video-related services, in particular, may be provided through these devices.

When providing content, such as video content, over a wireless network, it may be important to intelligently deliver the content to the mobile devices to limit strain on the wireless network. One known technique of delivering content is known as multicast broadcasts, in which a single channel may be used to broadcast content to multiple mobile devices. In contrast, with a unicast transmission, content transmitted to multiple mobile devices may require multiple channels that are each dedicated to a single mobile device.

With unicast, the signal strength of the radio interface between the mobile device and the base station, to which the mobile device is attached, may be directly measured by the mobile device and the base station. Mobile devices may provide a visual indication (e.g., an icon that displays a number of bars) that indicates the signal strength. A user may use the visual indication to quickly determine the current quality of the radio connection of the mobile device.

DETAILED DESCRIPTION OF PREFERRED EMBODIMENTS

The following detailed description refers to the accompanying drawings. The same reference numbers in different drawings may identify the same or similar elements.

Techniques described herein may generate a signal quality metric that measures the quality of a multicast broadcast that is being received by a mobile device. The signal quality metric may be visually displayed by the mobile device, such as through an icon that provides an indication of the signal strength of the multicast broadcast. For example, the icon may provide a binary indication of whether the multicast signal strength is adequate or not adequate, or provide a more fine-grained indication of the signal strength (e.g., an icon that indicates the signal strength of the multicast broadcast on a scale from zero to five).

The signal quality metric described herein may include a metric for a Multimedia Broadcast Multicast Service (MBMS) or an enhanced Multimedia Broadcast Multicast Service (eMBMS). The signal quality metric may be referred to as a Broadcast Signal Strength Indicator (BSSI). In some implementations, the BSSI for a mobile device may be determined based on a difference between a measured signal strength corresponding to the multicast broadcast, as well as on a minimum signal strength threshold level. The minimum signal strength threshold level may be calculated, by the mobile device, based on a number of factors, such as a multicast area associated with the mobile device, a coding scheme that is being used to transmit the multicast transmission, and other factors.

Figure 1:
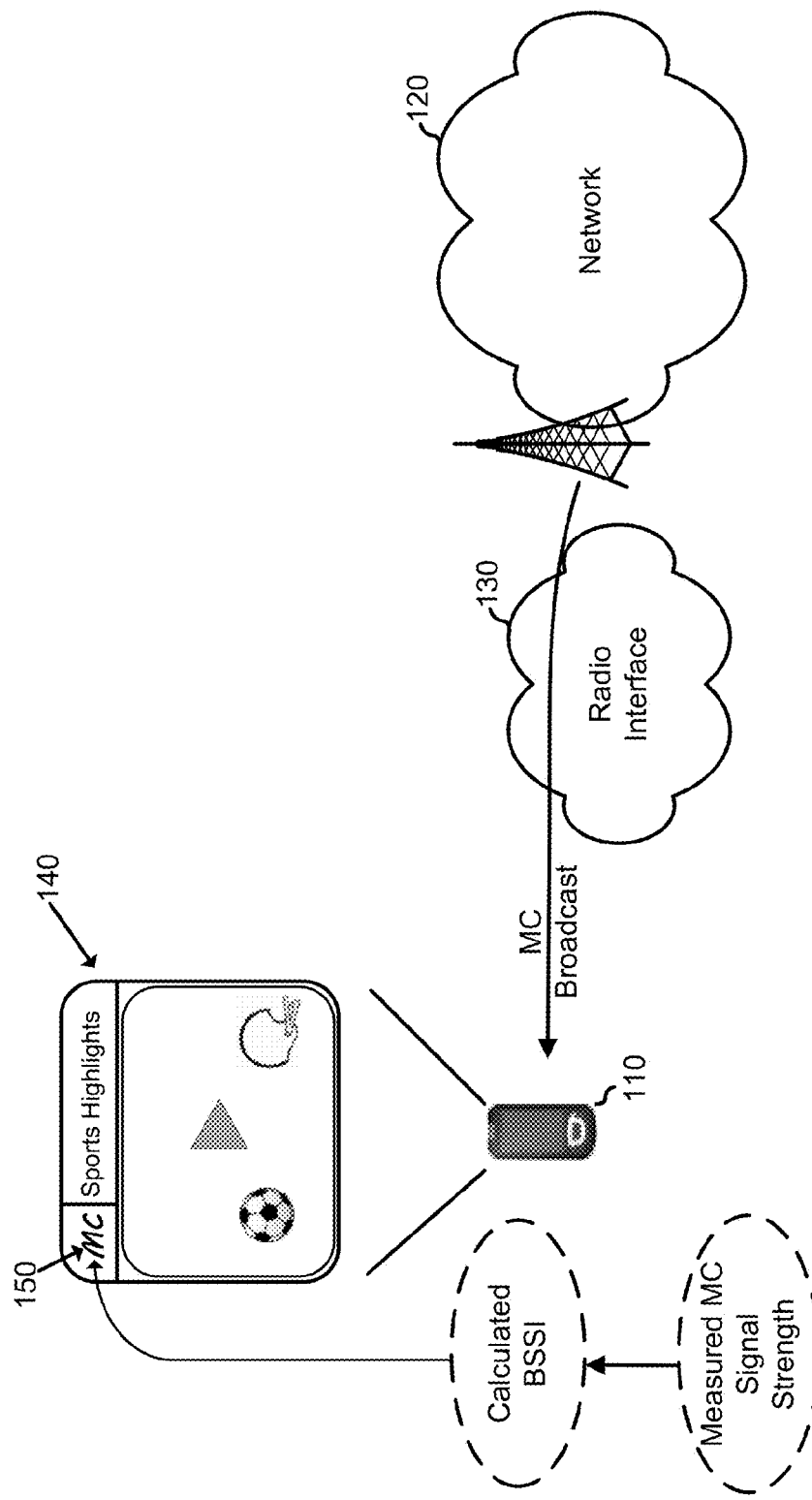
FIG. 1 is a diagram conceptually illustrating an example of an overview of concepts described herein.

FIG. 1 is a diagram conceptually illustrating an example of an overview of concepts described herein. As shown in FIG. 1, mobile device 110 may connect to network 120, such as a wireless network (e.g., a cellular wireless network), via radio interface 130. Radio interface 130 may correspond to radio signals, transmitted over the air, between mobile device 110 and network 120.

Network 120 may provide for communications via a multicast broadcast. In a multicast broadcast, a radio signal may be simultaneously transmitted by multiple base stations associated with network 120 (e.g., over multiple cells in a cellular wireless network). A number of mobile devices may receive the radio signal. In this manner, content, such as streaming video content, may be simultaneously broadcast to multiple mobile devices 110 over a single radio channel. Accordingly, multicasting content can be a relatively efficient technique for using the radio spectrum associated with radio interface 130. From the point of view of mobile device 110, an incoming multicast stream may be a one-way stream, where the mobile device may passively receive the stream but may not have an opportunity to provide feedback relating to the quality of the stream. In contrast, in a unicast transmission between a single mobile device and network 120, the mobile device and network 120 may adjust aspects of the radio signal to maximize reception at the mobile device (e.g., the signal power and/or the encoding scheme may be adjusted to compensate for factors, affecting the quality of the radio signal, that are unique to the mobile device).

In FIG. 1, assume that mobile device 110 (and potentially other mobile devices) receives a multicast broadcast ("MC Broadcast") from network 120. In this example, the multicast broadcast may be a video stream of sports highlights. Mobile device 110 may provide graphical interface 140, which presents the video stream, to the user of mobile device 110. Graphical interface 140 may include icon 150 that indicates the quality of the received radio signal that is associated with the multicast broadcast. In this example, icon 150 includes a textual icon "MC," which may be based on the BSSI that is calculated by mobile device 110. For example, when the received radio signal is strong enough to receive the video stream with high certainty, the strong BSSI may be represented as icon 150, which may be shown as green text. However, when the received radio signal is too weak to provide a quality video stream, the weak BSSI may be represented as icon 150, which may be shown as red text. In other implementations, other visual indications may be provided to convey the quality of the multicast signal.

In some implementations, the BSSI may be determined based on the strength of the multicast signal ("Measured MC Signal Strength"), as measured by mobile device 110. The measured multicast signal strength may be based on a signal to noise ratio (SNR) that is calculated by mobile device 110. Mobile device 110 may modify the measured multicast signal strength value, based on a number of other factors, to obtain the final BSSI value. For example, mobile device 110 may determine a theoretical minimum signal strength value based on factors, such as the geographical area of mobile device 110 and factors relating to the encoding scheme that is being used for the multicast broadcast. The final BSSI ("calculated BSSI") may be further based on a difference between the measured multicast signal strength and the theoretical minimum signal strength value. In some implementations, the determined difference may be further modified by an offset value to obtain the final BSSI.

Using techniques described herein, the BSSI, as determined by mobile device 110, may correspond to the user's perceived quality of the content that is received via the multicast broadcast. For example, in the situation in which icon 150 provides a binary indication of the quality of the multicast broadcast (e.g., green for good quality and red for poor quality), whether a multicast video stream can be received and presented may generally correspond to the representation of icon 150. In this example, when icon 150 is red, the video stream may be of poor quality and/or may be unwatchable. When icon 150 is green, however, the video stream may be of good quality.

Figure 2:
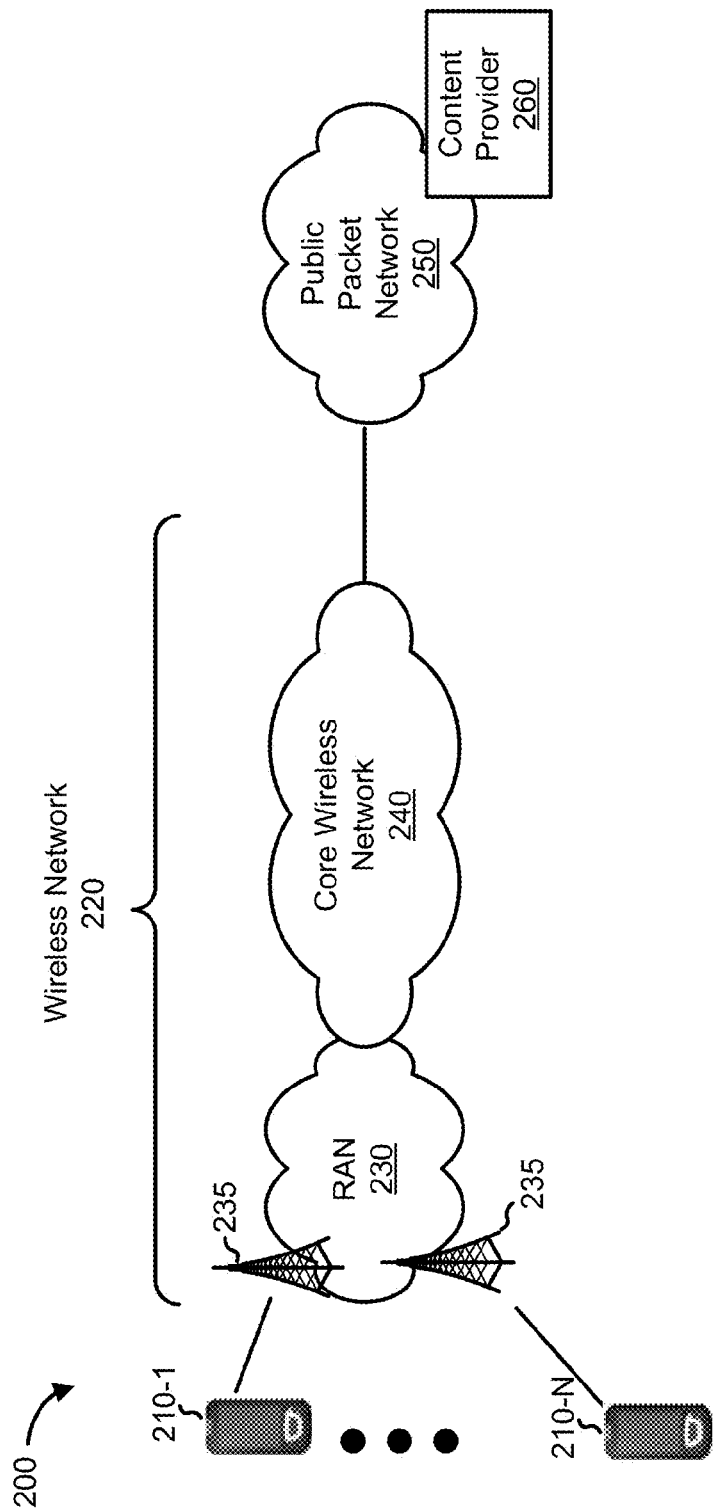
FIG. 2 is a diagram of an example environment in which systems and/or methods described herein may be implemented.

FIG. 2 is a diagram of an example environment 200 in which systems and/or methods described herein may be implemented. As illustrated, environment 200 may include one or more mobile devices 210-1 through 210-N (referred to collectively as "mobile devices 210" or singularly as "mobile device 210"). Mobile devices 210 may obtain network connectivity through wireless network 220 (e.g., a cellular network). Wireless network 220, as illustrated, may include radio access network (RAN) 230 and core wireless network 240.

One or more additional networks, such as a public packet network 250, may connect to core wireless network 220. Content provider 260 may include one or more devices, such as content servers, that deliver content (e.g., streaming audio or video) to mobile devices 210. The content, from content provider 260, may be delivered, over RAN 230, as multicast content.

Mobile devices 210 may include portable computing and communication devices, such as a personal digital assistant (PDA), a smart phone, a cellular phone, a laptop computer with connectivity to a cellular wireless network, a tablet computer, etc. Mobile devices 210 may also include non-portable computing devices, such as desktop computers, consumer or business appliances, set-top devices (STDs), or other devices that have the ability to connect to RAN 230. Mobile devices 210 may connect, through a radio link, to RAN 230. Through the radio link, mobile devices 210 may obtain data and/or voice services, such as content delivery services via which content (e.g., streaming video, streaming audio, or other content) may be delivered to mobile devices 210.

RAN 230 may include one or more devices that include radio interfaces to provide wireless connections to mobile devices 210. RAN 230 may provide wireless connectivity for wireless network 220. RAN 230 may include, for example, one or more base stations 235. Each base station 235 may provide one or more radio interfaces over which the base station may communicate with mobile devices 210. The radio interfaces may include, for example, orthogonal frequency-division multiplexing (OFDM) and/or single-carrier frequency-division multiple access (SC-FDMA) based radio interfaces. In the context of a network such as a long term evolution (LTE) network, base stations 235 may be referred to as evolved Node Bs (eNodeBs).

Core wireless network 240 may implement a network that provides routing, control, and data transmission services for mobile devices 210. Core wireless network 240 may connect to one or more other networks, such as to packet network 250, to provide network services to mobile devices 210. Core wireless network 240 may include one or more network devices used to implement control logic, physical links, and routing/switching functions that may be performed by core wireless network 240. In one implementation, core wireless network 240 may implement an LTE network.

Packet network 250 may include one or more packet networks, such as an Internet Protocol (IP) based packet network. Public packet network 250 may include a wide area network (WAN), a local area network (LAN), and/or combinations of WANs and LANs. Mobile devices 210 may access packet network 250 to obtain computation and/or data services from computing devices, such as from content provider 260.

Content provider 260 may include one or more server devices that provide content, such as on-demand video content, to mobile devices 210. A content provider 260 may, for example, be an entity that has the rights to provide television content, other video content, radio content, etc. Content provider 260 may provide content, destined for mobile devices 210, via packet network 250 and wireless network 220. As mentioned above, some of the content provided by content provider 260 may be multicast to multiple user devices 210.

Figure 3:
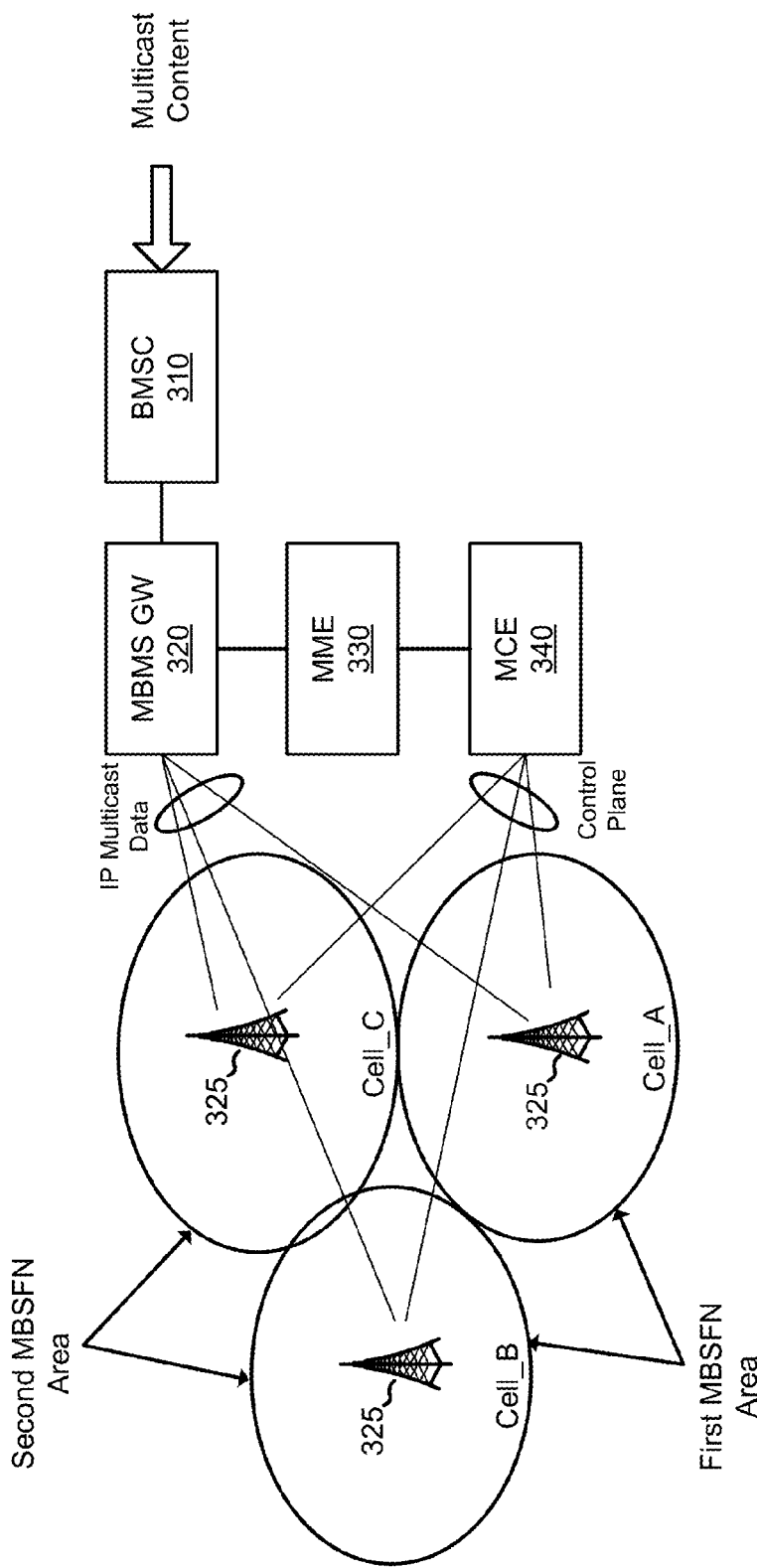
FIG. 3 is a diagram illustrating an example implementation of portions of the environment shown in FIG. 2.

FIG. 3 is a diagram illustrating an example implementation of portions of environment 200. In FIG. 3, elements of wireless network 220 may be particularly illustrated for an LTE network. In the context of an LTE network, multicast may be implemented as an eMBMS service. In other possible implementations, the functionality corresponding to the portions of environment 200 that are illustrated in FIG. 3 may be implemented based on other standards or technologies.

As shown in FIG. 3, an eMBMS service may be implemented using broadcast multicast service center (BMSC) 310, MBMS Gateway (MBMS GW) 320, Mobility Management Entity device (MME) 330, and Multi-cell/multicast Coordination Entity (MCE) 340. The eMBMS service may be provided to a number of wireless cells, labeled as Cell_A, Cell_B, and Cell_C. Each cell may be associated with a corresponding eNodeB 325.

BMSC 310 may include one or more computation or communication devices that provide for the coordination of multicast using eMBMS. BMSC 310 may perform functions relating to authorization, charging, and assignment of communication channels. For example, BMSC 310 may assign a particular number of multicast data channels for various multicast content streams. BMSC 310 may also receive content, such as from content provider 260. BMSC 310 may forward the received content as part of a multicast transmission.

MBMS GW 320 may include one or more computation or communication devices that provide for the coordination of the sending of multicast data (e.g., IP multicast packets) to base stations 235. MBMS GW 320 may receive the content, that is to be broadcast, from BMSC 310. As illustrated, MBMS GW 320 may transmit eMBMS data plane traffic ("IP Multicast Data") to eNodeBs 325.

MME 330 may include one or more computation and communication devices that gather, process, search, store, and/or provide information in a manner described herein. For example, MME 330 may perform operations relating to registering mobile devices 210 with the LTE network, the hand off mobile devices 210 from/to another network, and to policing operations on traffic destined for and/or received from mobile devices 210.

MCE 340 may include one or more computation or communication devices that may perform admission control, allocation of radio resources throughout a Multimedia Broadcast Multicast Service Single Frequency Network (MBSFN) area, MBMS session control signaling, and make decisions on radio configurations. As illustrated, MCE 340 may transmit eMBMS control plane traffic ("Control Plane") to eNodeBs 325.

In eMBMS, cells associated with eNodeBs 325 may be grouped to obtain MBSFN areas. Multicast data channels in a MBSFN area may be synchronized so that identical multicast radio signals may be generated, at the same time, for multiple cells. For example, MBSFN areas may be defined that cover the area associated with multiple ones of the illustrated cells. For example, a first MBSFN area may correspond to the area covered by Cell_A and Cell_B. A multicast data channel, transmitted in the first MBSFN area, may include radio signals that are synchronized in Cell_A and Cell_B. A second MBSFN area may correspond to the area covered by Cell_B and Cell_C.

Although FIGS. 2 and 3 illustrate example components of environment 200, in other implementations, environment 200 may contain fewer components, different components, differently arranged components, or additional components than those depicted. Alternatively, or additionally, one or more components of environment 200 may perform one or more other tasks described as being performed by one or more other components of environment 200.

Figure 4A:
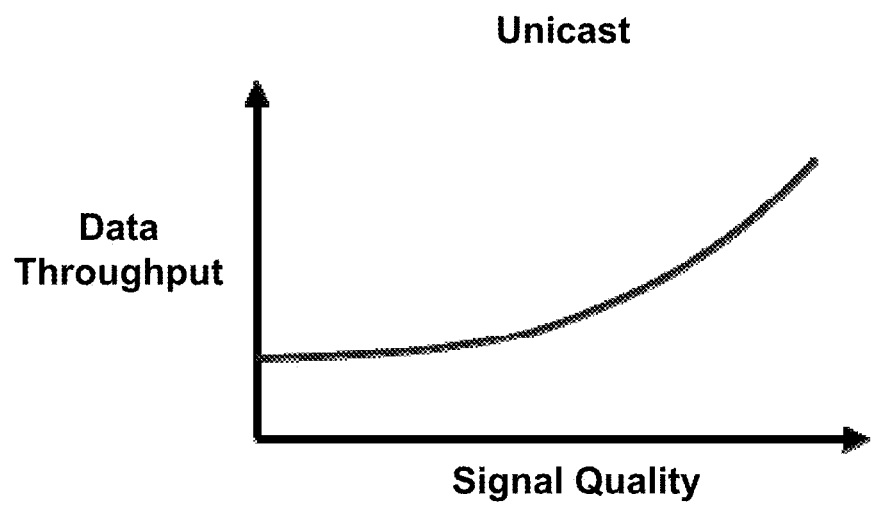
FIGS. 4A and 4B are diagrams conceptually illustrating a relationship between signal quality and data throughput for a unicast communication and a multicast broadcast, respectively.
Figure 4B:
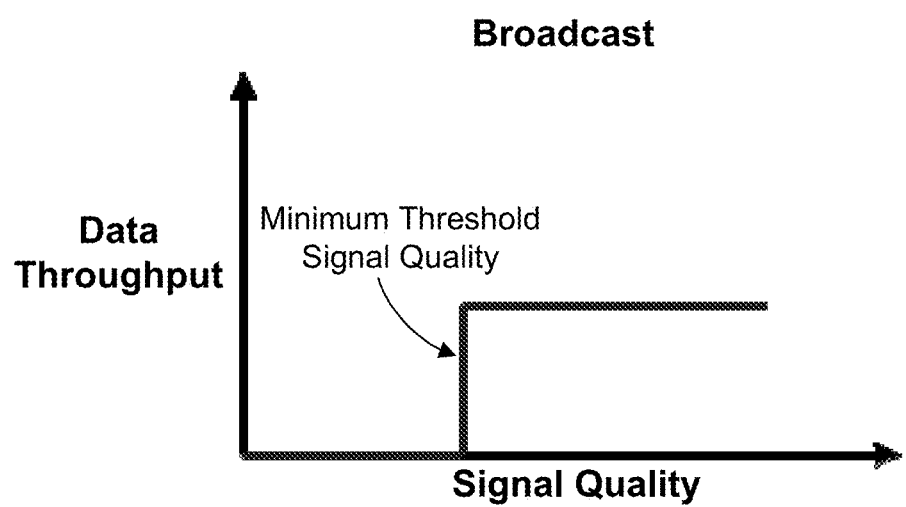

FIGS. 4A and 4B are diagrams conceptually illustrating the relationship between signal quality and data throughput for a unicast communication (FIG. 4A) and a multicast broadcast (FIG. 4B). As illustrated in FIG. 4A, the data throughput for a unicast communication may gradually and monotonically increase as the signal quality increases. The signal quality for a unicast communication, in the context of an LTE environment, may be referred to a LTE RSSI (Received Signal Strength Power) and may be calculated based on the average of the Reference Signal Broadcast Power (RSRP) and the received SNR. In unicast, mobile device 210 may receive a communication signal from a single cell and treat signals from other cells as interference.

As illustrated in FIG. 4B, for a multicast broadcast, a minimum threshold signal quality may be necessary to receive the multicast broadcast. When the signal quality falls below the threshold, the broadcast content may no longer be receivable. As previously mentioned, for a multicast broadcast, receiving mobile devices 210 may operate in a passive receiving mode in which feedback is not provided from mobile devices 210. In contrast to a unicast transmission for a multicast broadcast, an eNodeB 325 may transmit the data using a fixed modulation coding scheme (MCS).

Consistent with aspects described herein, the BSSI value, which may correspond to an amount by which the corresponding signal strength is greater than the minimum threshold signal quality value illustrated in FIG. 4B, may be determined based on a number of factors. The determination of the BSSI will be described in more detail below.

Figure 5:
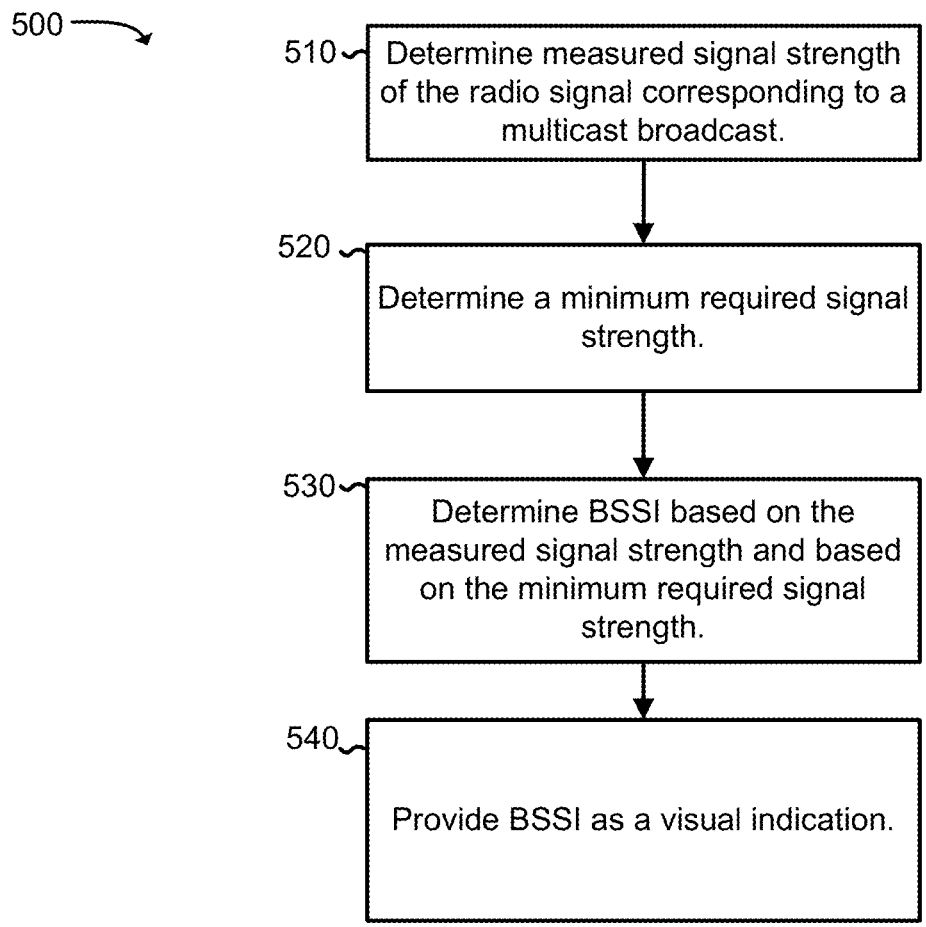
FIG. 5 is a flowchart illustrating an example process for determining and using a Broadcast Signal Strength Indicator (BSSI) for a multicast broadcast.

FIG. 5 is a flowchart illustrating an example process 500 for determining and using the BSSI for a multicast broadcast. In one implementation, process 500 may be implemented by mobile device 210, or by a combination of mobile device 210 and one or more network elements (e.g., devices in core wireless network 240). Process 500 may be implemented on a per-multicast signal (e.g., per-multicast broadcast or per-MBSFN) basis. Process 500 may be performed for a mobile device that is receiving one or more multicast broadcasts.

Process 500 may include determining a measured signal strength of the radio signal corresponding to a multicast broadcast (block 510). The measured signal strength may be referred to herein as $BSSI_{measured}$. For example, mobile device 210 may determine the SNR of the radio signal, corresponding to each of the multicast broadcasts that are being received by mobile device 210. In one implementation, mobile device 210 may measure, based on the received radio signal, the SNR for each MBSFN that is available in the cell to which mobile device 210 is attached. In other implementations, different metrics or techniques can be used to measure the signal strength of the radio signal corresponding to the multicast broadcast.

Process 500 may further include determining a minimum required signal strength (block 520). The minimum required signal strength may be referred to herein as $BSSI_{min}$. $BSSI_{min}$ may correspond to a minimum SNR value required to successfully receive and decode a multicast broadcast within a MBSFN area. In FIG. 4B, $BSSI_{min}$ may generally correspond to the minimum threshold signal quality. In one implementation, $BSSI_{min}$ may be determined based on factors such as the particular MCS being used for the multicast broadcasts, the symbol rate (a parameter relating to how much information, per unit of time, is being transmitted with the MCS) of the MCS being used, and/or the particular MBSFN. For example, $BSSI_{min}$ may be determined via query operation into a table (or other data structure) stored by mobile device 210. In another possible implementation, $BSSI_{min}$ may be determined based on a theoretical calculation performed based on the symbol rate and/or the MCS being used.

Process 500 may further include determining BSSI based on $BSSI_{measured}$ and based on the $BSSI_{min}$ (block 530). In one implementation, BSSI may be obtained based on a comparison of $BSSI_{measured}$ and $BSSI_{min}$. For example, when $BSSI_{min}$ is above the measured BSSI value, BSSI may be assigned a value that indicates that the multicast broadcast signal is not strong enough to receive multicast content. However, when $BSSI_{min}$ is below $BSSI_{measured}$, BSSI may be assigned a value that indicates that the multicast broadcast signal is strong enough to receive multicast content. As another example, BSSI may be calculated as a continuous value that is based on the difference between $BSSI_{measured}$ and $BSSI_{min}$.

In some implementations, other factors may additionally be used, other than $BSSI_{measured}$, when determining BSSI. For example, an offset value (e.g., based on particular geographic features of the MBSFN of the mobile device) may be applied to $BSSI_{min}$ value to obtain a "real world" $BSSI_{min}$. The real world $BSSI_{min}$ and $BSSI_{measured}$ may then be used to determine BSSI.

Process 500 may further include providing BSSI as a visual indication (block 540). As previously mentioned, an icon may provide a binary indication of whether the multicast signal strength is adequate or not adequate, or provide a more fine-grained indication of the signal strength (e.g., an icon that indicates the signal strength of the multicast broadcast on a scale from zero to five). In the situation in which the icon includes more than two visual states (e.g., the non-binary implementation), the magnitude of the difference between $BSSI_{measured}$ and $BSSI_{min}$ may be used to determine the strength of the multicast broadcast (e.g., one bar may be shown when the difference is just above zero, two bars when the difference is at least a certain amount above zero, etc.).

Figure 6:
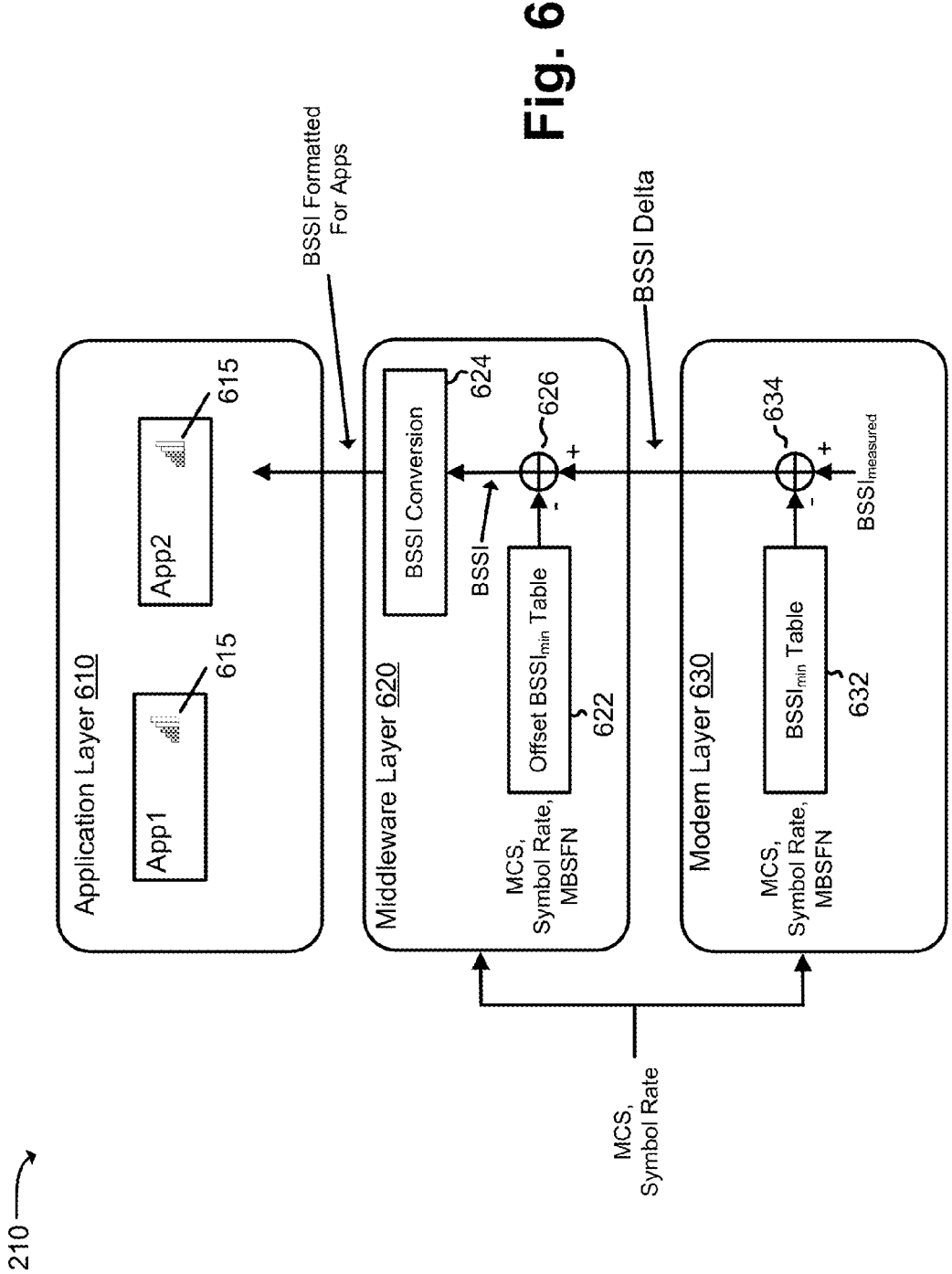
FIG. 6 is a diagram conceptually illustrating components that may be relevant to the providing an indication of BSSI to users of a mobile device.

FIG. 6 is a diagram conceptually illustrating components, of a mobile device 210, that may be relevant to the providing an indication of BSSI to users of the mobile device. The components, shown in FIG. 6, may calculate the BSSI according to one possible implementation of process 500.

As illustrated in FIG. 6, mobile device 210 may include application layer 610, middleware layer 620, and modem layer 630. Application layer 610 may represent components of mobile device 210 relating to the operation of user-level applications for mobile device 210. For example, a user may install a number of applications ("App1") and ("App2") on mobile device 210. The applications may provide video content that is received as a multicast broadcast. For example, one of the applications (e.g., "App1") may be provided by a content provider associated with a professional sports league. This application may display streaming content (transmitted as a multicast broadcast) of live sporting events. Another one of the applications (e.g., "App2") may be provided by a news provider. This application may display streaming content (transmitted as a multicast broadcast) of current news stories. Each of the applications may potentially display an icon 615 that indicates the quality of the multicast broadcast that is being provided by the application. In one implementation, the icon may be based on a value of the BSSI for the video stream being received by the application. The application may receive the BSSI by, for example, querying an application programming interface provided by middleware layer 620. The application may then visually present the BSSI to the user, such as via icon 615, which displays a number of bars (e.g., out of five) to indicate signal quality or via another visual representation. In an alternative possible implementation, instead of presenting a BSSI indicator to the user by applications associated with mobile device 210, a BSSI indicator or indicators may be provided by an operating system of mobile device 210 (e.g., by middleware layer 620 providing an indication of BSSI value(s) in a notification area of a graphical interface).

Middleware layer 620 may include processes executed, by mobile device 210, at a level below application layer 610. For example, middleware layer 620 may include an operating system associated with mobile device 210. Middleware layer 620 may provide an application programming interface, to applications associated with application layer 610, by which the applications can obtain BSSI value(s) associated with the multicast broadcasts to which mobile device 210 participates. Through the API, middleware layer 620 may provide the BSSI value(s) to application layer 610 ("BSSI formatted for Apps") in a format suitable for the applications (e.g., on a scale of one to five bars, a binary indication of whether a multicast broadcast is strong enough to acceptably receive multicast broadcasts, etc.).

Modem layer 630 may include logic to manage the radio interface, such as the radio interface used to connect to wireless network 220. For example, modem layer 630 may control the circuitry that implements the radio connection to wireless network 220.

Middleware layer 620 and modem layer 630 may include one or more components that may collectively determine the BSSI (or the BSSI formatted for applications). As illustrated, these components may include: offset $BSSI_{min}$ table 622, BSSI conversion component 624, summing component 626, $BSSI_{min}$ table 632, and summing component 634.

In operation, modem layer 630 may measure, or control the measuring of, the signal strength of the radio signal corresponding to the multicast broadcast ($BSSI_{measured}$). As previously mentioned, $BSSI_{measured}$ may correspond to the SNR of the radio signal of the multicast broadcast. Modem layer 630 may additionally determine the minimum required signal strength, $BSSI_{min}$. In one implementation, and as illustrated, $BSSI_{min}$ may be obtained by looking up a value in $BSSI_{min}$ table 632. $BSSI_{min}$ table 632 may include a multi-dimensional table indexed by one or more of the MCS being used by the multicast broadcast, the symbol rate being used by the multicast broadcast, and/or an identification of the MBSFN area associated with the multicast broadcast. The MCS and the symbol rate may be obtained, for example, from network 220, such as over a control plane corresponding to the multicast broadcast.

In one implementation, $BSSI_{min}$ table 632 may be implemented as a number of two-dimensional tables relating the MCS and the symbol rate, in which each of the two-dimensional tables corresponds to a particular MBSFN. $BSSI_{min}$ table 632 may be stored at mobile device 210 during manufacture, provided to mobile device 210 after provisioning of mobile device 210, such as during a software upgrade, or dynamically provided during operation of mobile device 210 (e.g., based on information in multicast overhead messages). In some implementations, the values stored in $BSSI_{min}$ table 632 may be dynamically calculated by mobile device 210.

Figure 7:
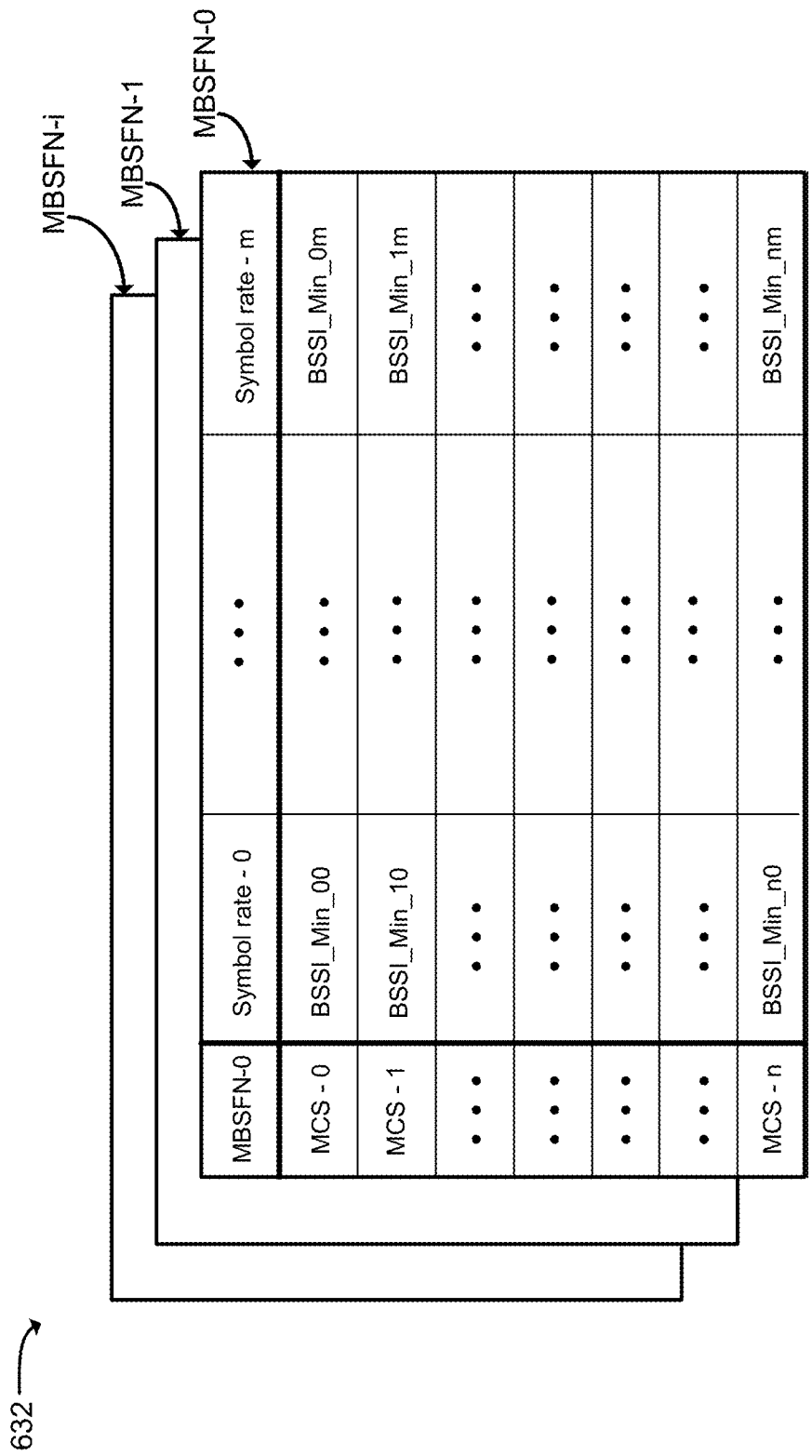
FIGS. 7 and 8 are diagrams illustrating example implementations of data structures that may be used to store values relating to the calculation of the BSSI.

FIG. 7 is a diagram illustrating an example implementation of $BSSI_{min}$ table 632. As illustrated, $BSSI_{min}$ table 632 may include a number of two-dimensional tables (table zero through table i), labeled as MBSFN-0, MBSFN-1, and MBSFN-i, where each two-dimensional table may include $BSSI_{min}$ values for a particular MBSFN area. Each two-dimensional table may include $BSSI_{min}$ values for different combinations of symbol rates and modulation coding schemes. For example, for the table corresponding to the MBSFN area that is identified as "MBSFN-0," $BSSI_{min}$ values are included for n+1 modulation coding schemes (MCS-0 through MCS-n) and m+1 different symbol rates (Symbol rate-0 through Symbol rate-m).

Referring back to FIG. 6, the $BSSI_{min}$ value, obtained from $BSSI_{min}$ table 632, may be subtracted from $BSSI_{measured}$, by summing component 634, to obtain "BSSI Delta." BSSI Delta may be combined with the output of offset $BSSI_{min}$ table 622 by summing component 626.

In some situations, real-world issues such as fading and multi-path interference may result in $BSSI_{min}$ not adequately or optimally reflecting a theoretical minimum signal strength value that is required to obtain satisfactory multicast broadcast quality. The output of offset $BSSI_{min}$ table 622 may be an offset value used to effectively change $BSSI_{min}$ to a more accurate value. In one implementation, the offset value may vary in different services areas and the offset values may be determined through real-world experimentation. In various implementations, the offset values may be positive or negative numbers. Offset $BSSI_{min}$ table 622 may be stored at mobile device 210 during manufacture, provided to mobile device 210 after provisioning of mobile device 210, such as during a software upgrade, or dynamically provided during operation of mobile device 210 (e.g., based on information in multicast overhead messages).

Figure 8:
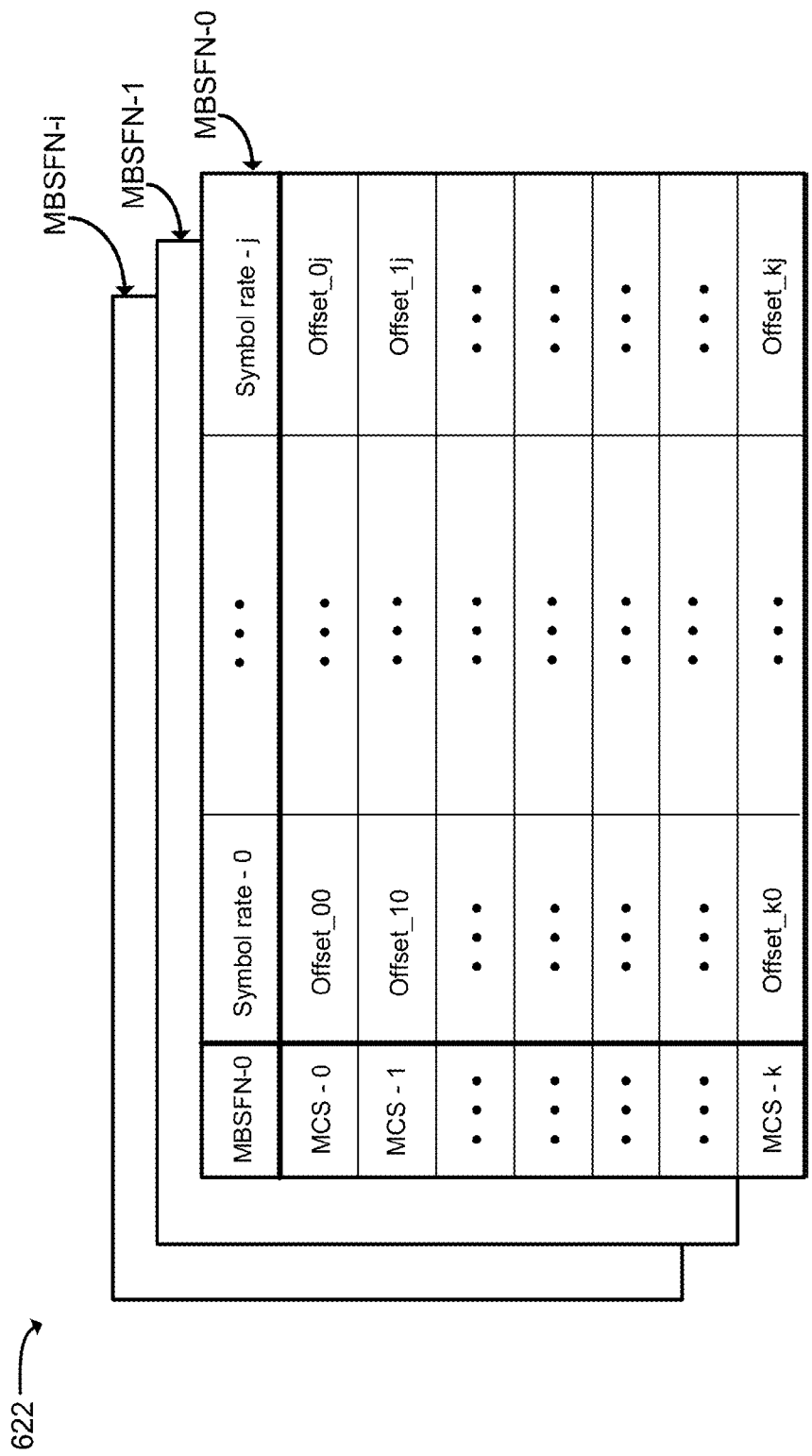

FIG. 8 is a diagram illustrating an example implementation of offset $BSSI_{min}$ table 622. As illustrated, offset $BSSI_{min}$ table 622 may include a number of two-dimensional tables (table zero through table i), labeled as MBSFN-0, MBSFN-1, and MBSFN-i, where each two-dimensional table may include offset values for a particular MBSFN area. Each two-dimensional table may include offset values for different combinations of symbol rates and modulation coding schemes. For example, for the table corresponding to the MBSFN area that is identified as "MBSFN-0," offset values are included for k+1 modulation coding schemes (MCS-0 through MCS-k) and j+1 different symbol rates (Symbol rate-0 through Symbol rate-j).

Figure 9:
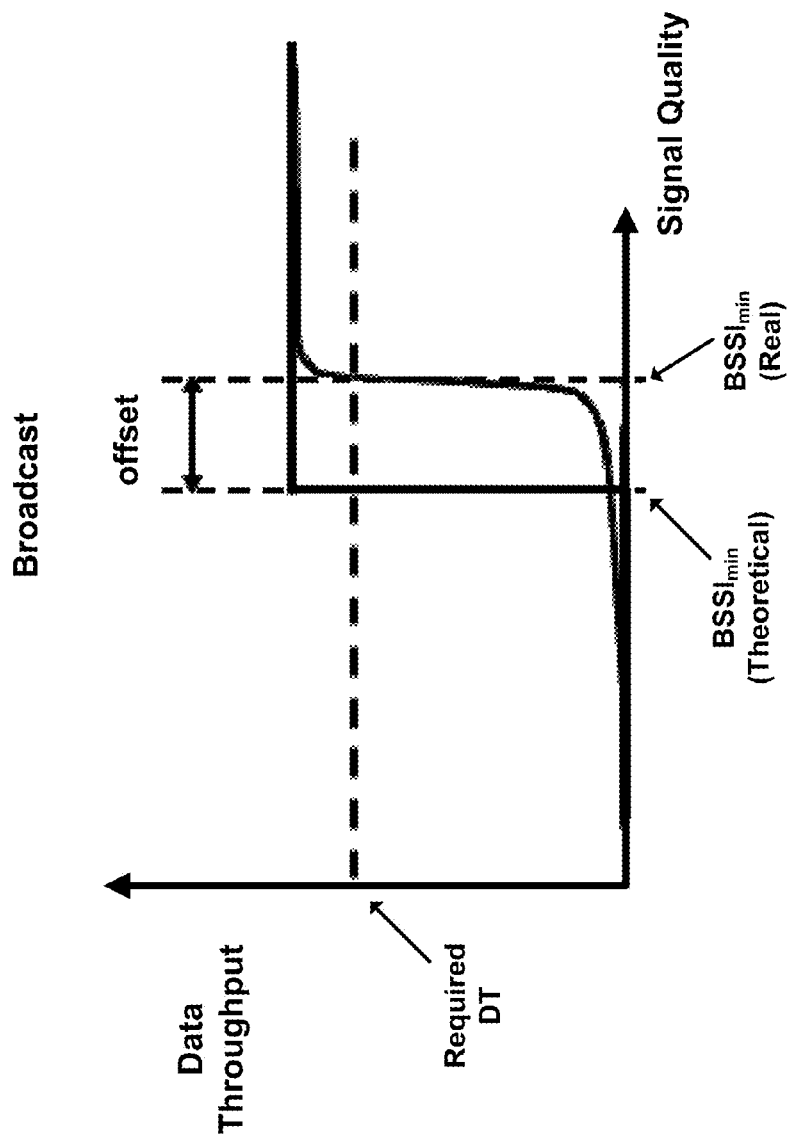
FIG. 9 is a diagram conceptually illustrating the concept of an offset value.

FIG. 9 is a diagram conceptually illustrating the concept of an offset value, such as the offset values stored in offset $BSSI_{min}$ table 622. As shown in FIG. 9, assume that $BSSI_{min}$, as output by $BSSI_{min}$ table 632 ("$BSSI_{min}$ Theoretical"), is below a level need to obtain acceptable data throughput for a multicast broadcast (illustrated by the horizontal line labeled as Required Data Throughput (DT)). As mentioned, this may be due to real-world transmission issues, such as fading, multi-path interference, or other factors. The offset value, as output from offset $BSSI_{min}$ table 622, may be determined based on field trials, and may be used to modify $BSSI_{min}$. As indicated, after application of the offset value, $BSSI_{min}$ ("$BSSI_{min}$ Real") may more closely match the real world minimum signal quality needed to obtain an acceptable multicast broadcast.

Referring back to FIG. 6, the offset value, obtained from offset $BSSI_{min}$ table 622, may be subtracted from BSSI Delta, by summing component 626. The output of summing component 626 may represent the value of the BSSI. In some implementations, the BSSI may be converted, by BSSI conversion component 624, to a value that may more directly correspond to a visual presentation of the BSSI. For example, as previously discussed, the BSSI may be converted to an integer value between zero and five bars. Alternatively or additionally, the BSSI may be converted to another format, such as a binary value indicating that the multicast signal strength is adequate or not adequate.

One example of a conversion operation, that may be performed by BSSI conversion component 624, is illustrated in Table I. Table I includes example thresholds for performing quantization of a continuous BSSI value into discrete states (e.g., zero through five bars). For example, as shown in Table I, a BSSI value corresponding to a SNR greater than or equal to 17 dB may be converted to a value of five bars. Another example of a conversion operation, that may be performed by BSSI conversion component 624, is illustrated in Table II. Table II includes example thresholds for performing quantization of a continuous BSSI value into binary states (e.g., strong enough signal strength or not strong enough). For example, as shown in Table II, a BSSI value corresponding to a SNR greater than or equal to 2 dB may be converted to a value of "multicast broadcast is available."

TABLE I

| BSSI Value | Number of Bars |
| --- | --- |
| SNR >= 17.0 dB | 5 |
| 13.0 db <= SNR < 17.0 dB | 4 |
| 9.0 db <= SNR < 13.0 dB | 3 |
| 5.0 db <= SNR < 9.0 dB | 2 |
| 2.0 db <= SNR < 5.0 dB | 1 |
| SNR < 2.0 dB | 0 |

TABLE II

| BSSI Value | Number of Bars |
| --- | --- |
| SNR >= 2.0 dB | multicast broadcast is available |
| SNR < 2.0 dB | multicast broadcast is not available |

As described above, a signal strength metric (BSSI) may be determined for a multicast broadcast. The BSSI may provide an indication of the strength of the received multicast broadcast with respect to a minimum acceptable threshold level. The minimum acceptable threshold level may be determined based on both a theoretical determination of a minimum value and based on real-world observations.

Figure 10:
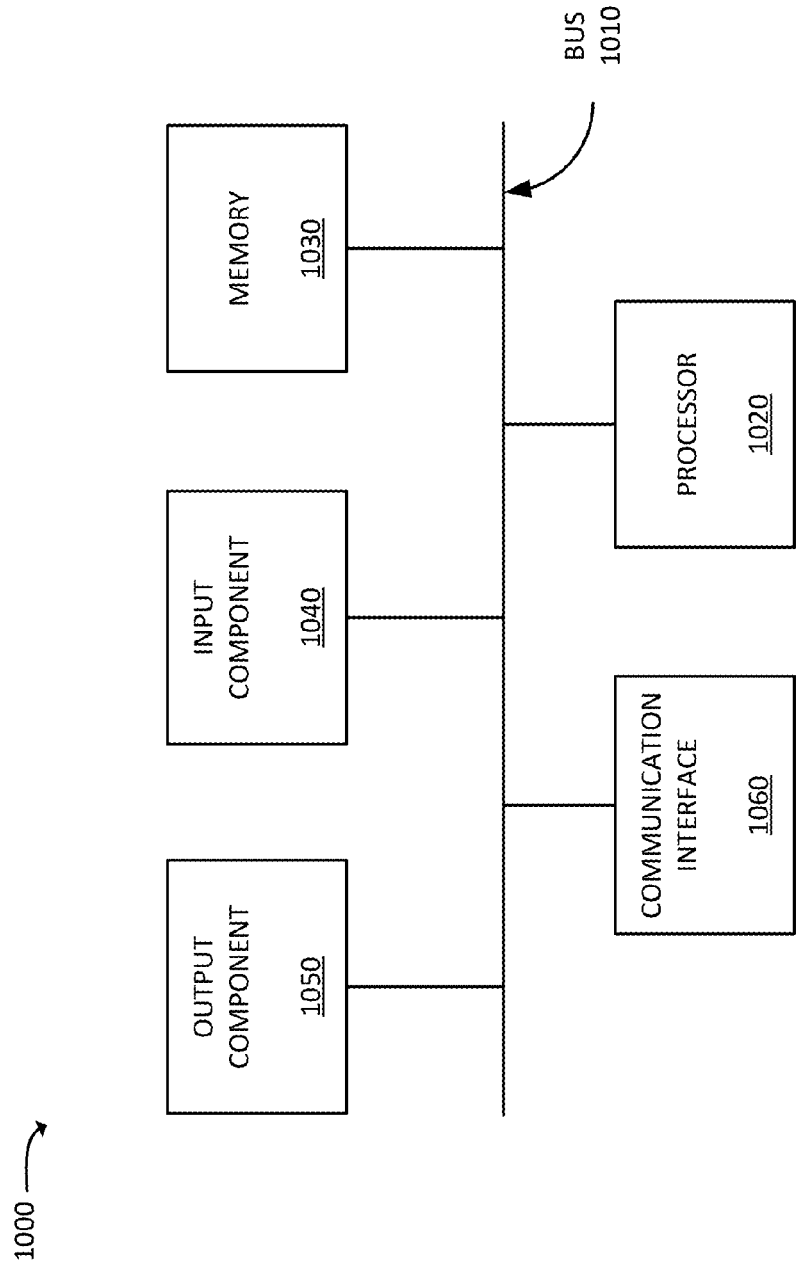
FIG. 10 is a diagram of example components of a device.

FIG. 10 is a diagram of example components of a device 1000. Each of the devices described above (e.g., devices illustrated in FIGS. 1-3 and 6) may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes (LEDs), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared (IR) receiver, a Bluetooth radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks has been described with regard to FIG. 5, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A method comprising: receiving, by a mobile device, a radio signal corresponding to a multicast broadcast of content;
   measuring, by the mobile device, a strength of the received radio signal; determining, by the mobile device, a minimum signal strength to receive the content associated with the multicast broadcast based on a particular modulation coding scheme (MCS) being used to broadcast the content, a particular symbol rate being used to broadcast the content, and an identification of a particular Multicast Service Single Frequency Network (MBSFN) coverage area associated with the received signal; determining, by the mobile device, a signal quality metric, associated with the multicast broadcast, the signal quality metric being based on a difference between the measured strength of the radio signal and the determined minimum signal strength; and
   wherein the determining of the minimum signal strength includes: determining, by the mobile device, a theoretical signal strength required to receive the content from an MBSFN of the particular MBSFN coverage area, based on the particular MCS and a particular symbol rate used to broadcast the content,
   determining, by the mobile device, an offset value based on the particular MCS, the particular symbol rate, and the particular MBSFN coverage area, of a plurality of MBSFN coverage areas, of the particular MBSFN, the plurality of MBSFN coverage areas corresponding to different offset values representing current transmission conditions of the plurality of MBSFN coverage areas; and
   providing, by the mobile device, a visual indication of the signal quality metric.

2. The method of claim 1, wherein determining the minimum signal strength further includes:
   querying a table, stored by the mobile device, based on the particular modulation coding scheme (MCS) being used to broadcast the content, the particular symbol rate being used to broadcast the content, and the identification of a Multicast Service Single Frequency Network (MBSFN) area associated with the received signal.

3. The method of claim 1, further comprising:
   performing a quantization of the signal quality metric to obtain a value associated with the visual indication.

4. The method of claim 3, wherein the value associated with the visual indication includes a binary value.

5. The method of claim 1, wherein determining the minimum signal strength further comprises:
   querying a first data structure to initially determine the minimum signal strength;
   querying a second data structure to determine an offset value; and
   modifying the initially determined minimum signal strength by the offset value.

6. The method of claim 5, wherein the first data structure and the second data structure include tables that are prestored at the mobile device.

7. The method of claim 5, wherein the first and second data structures are received from a network associated with the multicast broadcast.

8. The method of claim 1, wherein the signal quality metric is determined on a per-multicast signal basis.

9. The method of claim 1, wherein the strength of the received radio signal is measured as a signal to noise ratio (SNR) of the radio signal.

10. A mobile device comprising: a memory; and at least one processor to execute instructions in the memory to:
    receive a radio signal corresponding to a multicast broadcast of content, measure a strength of the received radio signal, determine a minimum signal strength to receive the content associated with the multicast broadcast based on a particular modulation coding scheme (MCS) being used to broadcast the content, a particular symbol rate being used to broadcast the content, and an identification of a particular Multicast Service Single Frequency Network (MBSFN) coverage area associated with the received signal, determine a signal quality metric, associated with the multicast broadcast, the signal quality metric being based on a difference between the measured strength of the signal and the determined minimum signal strength, and
    wherein the determining of the minimum signal strength includes: determining, by the mobile device, a theoretical signal strength required to receive the content from an MBSFN of the particular MBSFN coverage area, based on the particular MCS and a particular symbol rate used to broadcast the content,
    determining, by the mobile device, an offset value based on the particular MCS, the particular symbol rate, and the particular MBSFN coverage area, of a plurality of MBSFN coverage areas, of the particular MBSFN, the plurality of MBSFN coverage areas corresponding to different offset values representing current transmission conditions of the plurality of MBSFN coverage areas, and
    provide a visual indication of the signal quality metric.

11. The mobile device of claim 10, wherein, when determining the minimum signal strength, the at least one processor is to further execute instructions in the memory to:
    query a table, stored by the mobile device, based on the particular MCS being used to broadcast the content, the particular symbol rate being used to broadcast the content, and the identification of a MBSFN area associated with the received signal.

12. The mobile device of claim 10, wherein the at least one processor is to further execute instructions in the memory to:
perform a quantization of the signal quality metric to obtain a value associated with the visual indication.

13. The mobile device of claim 12, wherein the value associated with the visual indication includes a binary value.

14. The mobile device of claim 12, wherein the value associated with the visual indication includes a number representing a number of bars to provide to a user of the mobile device.

15. The device of claim 10, wherein, determining the minimum signal strength, the at least one processor is to further execute instructions in the memory to:
query a first data structure to initially determine the minimum signal strength;
query a second data structure to determine an offset value; and
modify the initially determined minimum signal strength by the offset value.

16. The device of claim 15, wherein the first and second data structures are received from a network associated with the multicast broadcast.

17. The device of claim 15, wherein the first data structure and the second data structure include tables that are pre-stored at the mobile device.

18. A method comprising:
receiving, by a mobile device, a radio signal corresponding to a multicast broadcast of content; measuring, by the mobile device, a strength of the received radio signal; determining, by the mobile device, a first value corresponding to a theoretical minimum signal strength needed to receive the content associated with the multicast broadcast based on a particular modulation coding scheme (MCS) being used to broadcast the content, a particular symbol rate being used to broadcast the content, and an identification of a particular Multicast Service Single Frequency Network (MBSFN) coverage area associated with the received signal; and wherein the determining of the minimum signal strength includes:
determining, by the mobile device, a theoretical signal strength required to receive the content from an MBSFN of the particular MBSFN coverage area, based on the particular MCS and a particular symbol rate used to broadcast the content,
determining, by the mobile device, an offset value based on the particular MCS, the particular symbol rate, and the particular MBSFN coverage area, of a plurality of MBSFN coverage areas, of the particular MBSFN, the plurality of MBSFN coverage areas corresponding to different offset values representing current transmission conditions of the plurality of MBSFN coverage areas, and
determining, by the mobile device, a second value, corresponding to an adjustment amount, to the first value, the adjustment amount being determined based on experimentation;
determining, by the mobile device, a signal quality metric, associated with the multicast broadcast, based on the measured strength of the received radio signal, the first value, and the second value; and
providing, by the mobile device, a visual indication of the signal quality metric.

19. The method of claim 18, wherein determining the second value includes:
querying a table, stored by the mobile device, based on a particular modulation coding scheme (MCS) being used to broadcast the content, a particular symbol rate being used to broadcast the content, and an identification of a Multicast Service Single Frequency Network (MBSFN) area associated with the received signal.

20. The method of claim 19, wherein values in the table are received over a control channel associated with the multicast broadcast.

21. The method of claim 1, wherein determining the minimum signal strength to receive the content associated with the multicast broadcast comprises:
determining the MBSFN coverage area associated with the received signal,
determining an MCS that is associated with the MBSFN coverage area and used to broadcast the content,
determining a symbol rate that is associated with the MBSFN coverage area and used to broadcast the content, and
determining the minimum signal strength to receive the content associated with the multicast broadcast based on a combination of the MCS and the symbol rate.

* * * * *